(12) United States Patent
Gauthier et al.

(10) Patent No.: US 7,703,668 B2
(45) Date of Patent: Apr. 27, 2010

(54) COMPACT PROTOCOL AND SOLUTION FOR SUBSTANTIALLY OFFLINE MESSAGING BETWEEN PORTABLE CONSUMER DEVICE AND BASE DEVICE

(75) Inventors: Patrick Gauthier, Mountain View, CA (US); Ayman Hammad, Pleasanton, CA (US); Roger Merckling, Palo Alto, CA (US)

(73) Assignee: Vista U.S.A., San Mateo, CA (US)

( * ) Notice: Subject to any disclaimer, the term of this patent is extended or adjusted under 35 U.S.C. 154(b) by 0 days.

(21) Appl. No.: 11/584,398

(22) Filed: Oct. 19, 2006

(65) Prior Publication Data

US 2007/0034679 A1    Feb. 15, 2007

Related U.S. Application Data

(63) Continuation of application No. 11/491,551, filed on Jul. 20, 2006, which is a continuation of application No. 10/990,289, filed on Nov. 15, 2004, now Pat. No. 7,152,780, which is a continuation of application No. 10/244,044, filed on Sep. 13, 2002, now Pat. No. 6,837,425.

(51) Int. Cl.
  *G06F 17/00* (2006.01)
(52) U.S. Cl. ......................... 235/375; 705/14
(58) Field of Classification Search ................. 235/375, 235/492–493; 705/14
  See application file for complete search history.

(56) References Cited

U.S. PATENT DOCUMENTS

| | | | |
|---|---|---|---|
| 4,559,497 A | 12/1985 | Farrugia | |
| 4,674,041 A | 6/1987 | Lemon et al. | |
| 4,701,518 A | 10/1987 | Osborn et al. | |
| 4,743,732 A | 5/1988 | Alpatiev et al. | |
| 4,849,942 A | 7/1989 | Farrugia | |
| 4,851,654 A | 7/1989 | Nitta | |
| 5,007,026 A | 4/1991 | Gaultier et al. | |
| 5,063,508 A * | 11/1991 | Yamada et al. | 704/3 |
| 5,131,039 A | 7/1992 | Chaum | |
| 5,138,580 A | 8/1992 | Farrugia et al. | |
| 5,267,123 A | 11/1993 | Boothroyd et al. | |
| 5,276,736 A | 1/1994 | Chaum | |
| 5,305,196 A | 4/1994 | Deaton et al. | |
| 5,327,508 A | 7/1994 | Deaton et al. | |
| 5,347,632 A | 9/1994 | Filepp et al. | |
| 5,369,261 A | 11/1994 | Shamir | |
| 5,388,165 A | 2/1995 | Deaton et al. | |
| 5,430,644 A | 7/1995 | Deaton et al. | |
| 5,448,471 A | 9/1995 | Deaton et al. | |

(Continued)

FOREIGN PATENT DOCUMENTS

WO    WO 00/03328 A1    1/2000

*Primary Examiner*—Daniel A Hess
(74) *Attorney, Agent, or Firm*—Townsend and Townsend and Crew LLP

(57) ABSTRACT

A method for providing messaging between a portable device and base device is provided. The method included communicating one or more message codes maintained in the portable device to the base device. The base device then composes a message for a user of the portable device using a dictionary of message codes. The message codes have corresponding message values, which are used to generate the message for the one or more message codes. The generated message is then provided to the user.

21 Claims, 3 Drawing Sheets

U.S. PATENT DOCUMENTS

| | | |
|---|---|---|
| 5,483,444 A | 1/1996 | Heintzeman et al. |
| D367,410 S | 2/1996 | Hortnagl |
| D367,594 S | 3/1996 | Hortnagl |
| 5,496,417 A | 3/1996 | Farrugia et al. |
| 5,502,636 A | 3/1996 | Clarke |
| 5,542,430 A | 8/1996 | Farrugia et al. |
| 5,564,073 A | 10/1996 | Takahisa |
| 5,568,555 A | 10/1996 | Shamir |
| 5,577,266 A | 11/1996 | Takahisa et al. |
| 5,579,537 A | 11/1996 | Takahisa |
| 5,592,560 A | 1/1997 | Deaton et al. |
| 5,594,910 A | 1/1997 | Filepp et al. |
| 5,604,921 A | 2/1997 | Alanaza |
| 5,621,812 A | 4/1997 | Deaton et al. |
| 5,625,791 A | 4/1997 | Farrugia et al. |
| 5,629,980 A | 5/1997 | Stefik et al. |
| 5,634,012 A | 5/1997 | Stefik et al. |
| 5,638,443 A | 6/1997 | Stefik et al. |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,469 A | 8/1997 | Deaton et al. |
| 5,671,698 A | 9/1997 | Farrugia |
| 5,675,662 A | 10/1997 | Deaton et al. |
| 5,680,353 A | 10/1997 | Gaultier et al. |
| 5,687,322 A | 11/1997 | Deaton et al. |
| 5,710,886 A | 1/1998 | Christensen et al. |
| 5,713,488 A | 2/1998 | Farrugia |
| 5,715,403 A | 2/1998 | Stefik |
| 5,734,719 A | 3/1998 | Tsevdos et al. |
| 5,758,072 A | 5/1998 | Filepp et al. |
| 5,761,648 A | 6/1998 | Golden et al. |
| 5,791,991 A | 8/1998 | Small |
| 5,796,967 A | 8/1998 | Filepp et al. |
| 5,806,044 A | 9/1998 | Powell |
| 5,812,668 A | 9/1998 | Weber |
| 5,813,318 A | 9/1998 | Zanin et al. |
| 5,815,657 A | 9/1998 | Williams et al. |
| 5,822,735 A | 10/1998 | DeLapa et al. |
| 5,828,848 A | 10/1998 | MacCormack et al. |
| 5,844,218 A | 12/1998 | Kawan et al. |
| 5,850,446 A | 12/1998 | Berger et al. |
| 5,855,007 A | 12/1998 | Jovicic et al. |
| 5,867,494 A | 2/1999 | Krishnaswamy et al. |
| 5,867,495 A | 2/1999 | Elliott et al. |
| 5,870,030 A | 2/1999 | DeLuca et al. |
| 5,875,305 A | 2/1999 | Winter et al. |
| 5,884,277 A | 3/1999 | Khosla |
| 5,889,863 A | 3/1999 | Weber |
| 5,895,073 A | 4/1999 | Moore |
| 5,905,246 A | 5/1999 | Fajkowski |
| 5,907,830 A | 5/1999 | Engel et al. |
| 5,924,080 A | 7/1999 | Johnson |
| 5,931,917 A | 8/1999 | Nguyen et al. |
| 5,943,241 A | 8/1999 | Nichols et al. |
| 5,943,424 A | 8/1999 | Berger et al. |
| 5,963,924 A | 10/1999 | Williams et al. |
| 5,971,925 A | 10/1999 | Hossack et al. |
| 5,974,235 A | 10/1999 | Nunally et al. |
| 5,974,399 A | 10/1999 | Giuliani et al. |
| 5,978,840 A | 11/1999 | Nguyen et al. |
| 5,983,208 A | 11/1999 | Haller et al. |
| 5,987,132 A | 11/1999 | Rowney |
| 5,996,076 A | 11/1999 | Rowney et al. |
| 5,999,525 A | 12/1999 | Krishnaswamy et al. |
| 6,002,767 A | 12/1999 | Kramer |
| 6,002,771 A | 12/1999 | Nielsen |
| 6,009,411 A | 12/1999 | Kepecs |
| 6,009,415 A | 12/1999 | Shurling et al. |
| 6,012,038 A | 1/2000 | Powell |
| 6,012,049 A | 1/2000 | Kawan |
| 6,014,634 A | 1/2000 | Scroggie et al. |
| 6,016,484 A | 1/2000 | Williams et al. |
| 6,018,718 A | 1/2000 | Walker et al. |
| 6,026,379 A | 2/2000 | Haller et al. |
| 6,035,280 A | 3/2000 | Christensen |
| 6,038,492 A | 3/2000 | Nichols et al. |
| 6,041,309 A | 3/2000 | Laor |
| D423,147 S | 4/2000 | Farrugia |
| 6,049,778 A | 4/2000 | Walker et al. |
| 6,061,660 A | 5/2000 | Eggleston et al. |
| 6,061,665 A | 5/2000 | Bahreman |
| 6,061,791 A | 5/2000 | Moreau |
| 6,067,526 A | 5/2000 | Powell |
| 6,067,529 A | 5/2000 | Ray et al. |
| 6,070,147 A | 5/2000 | Harms et al. |
| 6,072,781 A | 6/2000 | Feeney et al. |
| 6,072,870 A | 6/2000 | Nguyen et al. |
| 6,076,068 A | 6/2000 | DeLapa et al. |
| 6,076,069 A | 6/2000 | Laor |
| 6,076,101 A | 6/2000 | Kamakura et al. |
| 6,078,888 A | 6/2000 | Johnson, Jr. |
| 6,119,105 A | 9/2000 | Williams |
| 6,119,933 A | 9/2000 | Wong et al. |
| 6,128,599 A | 10/2000 | Walker et al. |
| 6,163,772 A | 12/2000 | Kramer et al. |
| D436,489 S | 1/2001 | Farrugia |
| 6,178,409 B1 | 1/2001 | Weber et al. |
| 6,182,123 B1 | 1/2001 | Filepp et al. |
| 6,185,307 B1 | 2/2001 | Johnson, Jr. |
| 6,185,541 B1 | 2/2001 | Scroggie et al. |
| 6,185,766 B1 | 2/2001 | Farrugia |
| 6,195,661 B1 | 2/2001 | Filepp et al. |
| 6,199,100 B1 | 3/2001 | Filepp et al. |
| 6,199,762 B1 | 3/2001 | Hohle |
| 6,213,879 B1 | 4/2001 | Niizuma et al. |
| 6,217,165 B1 | 4/2001 | Silverbrook |
| D442,748 S | 5/2001 | Farrugia |
| 6,229,621 B1 | 5/2001 | Kulakowski et al. |
| 6,236,971 B1 | 5/2001 | Stefik et al. |
| 6,237,145 B1 | 5/2001 | Narasimhan et al. |
| D444,271 S | 6/2001 | Farrugia |
| 6,246,778 B1 | 6/2001 | Moore |
| 6,253,027 B1 | 6/2001 | Weber et al. |
| 6,275,852 B1 | 8/2001 | Filepp et al. |
| 6,289,324 B1 | 9/2001 | Kawan |
| 6,292,786 B1 | 9/2001 | Deaton et al. |
| 6,304,915 B1 | 10/2001 | Nguyen et al. |
| 6,307,958 B1 | 10/2001 | Deaton et al. |
| 6,315,200 B1 | 11/2001 | Silverbrook et al. |
| 6,317,192 B1 | 11/2001 | Silverbrook et al. |
| 6,321,208 B1 | 11/2001 | Barnett et al. |
| 6,324,525 B1 | 11/2001 | Kramer et al. |
| 6,324,603 B1 | 11/2001 | Niizuma et al. |
| 6,330,543 B1 | 12/2001 | Kepecs |
| 6,332,463 B1 | 12/2001 | Farrugia et al. |
| 6,334,108 B1 | 12/2001 | Deaton et al. |
| 6,335,927 B1 | 1/2002 | Elliott et al. |
| 6,336,098 B1 | 1/2002 | Fortenberry et al. |
| 6,336,099 B1 | 1/2002 | Barnett et al. |
| 6,338,105 B1 | 1/2002 | Niizuma et al. |
| 6,351,688 B1 | 2/2002 | Nichols et al. |
| 6,351,735 B1 | 2/2002 | Deaton et al. |
| 6,356,715 B1 | 3/2002 | Silverbrook |
| 6,356,794 B1 | 3/2002 | Perin, Jr. et al. |
| 6,362,868 B1 | 3/2002 | Silverbrook |
| 6,362,869 B1 | 3/2002 | Silverbrook |
| 6,363,154 B1 | 3/2002 | Peyravian et al. |
| 6,363,363 B1 | 3/2002 | Haller et al. |
| 6,367,474 B1 | 4/2002 | Berthon-Jones et al. |
| 6,373,950 B1 | 4/2002 | Rowney |
| 6,377,935 B1 | 4/2002 | Deaton et al. |
| 6,424,949 B1 | 7/2002 | Deaton et al. |

| | | | | | |
|---|---|---|---|---|---|
| 6,424,951 B1 | 7/2002 | Shurling et al. | 2001/0049620 A1 | 12/2001 | Blasko |
| 6,434,534 B1 | 8/2002 | Walker et al. | 2002/0008147 A1 | 1/2002 | Coiton et al. |
| 6,470,181 B1 | 10/2002 | Maxwell | 2002/0026575 A1 | 2/2002 | Wheeler et al. |
| 6,505,046 B1 | 1/2003 | Baker | 2002/0091569 A1 | 7/2002 | Kitaura et al. |
| 6,516,302 B1 | 2/2003 | Deaton et al. | 2002/0132613 A1 | 9/2002 | Leung et al. |
| 6,601,759 B2 | 8/2003 | Fife et al. | 2002/0165775 A1 | 11/2002 | Tagseth et al. |
| 6,609,104 B1 | 8/2003 | Deaton et al. | 2002/0198777 A1 | 12/2002 | Yuasa |
| 6,611,811 B1 | 8/2003 | Deaton et al. | 2003/0058261 A1 | 3/2003 | Challa et al. |
| 6,647,257 B2 | 11/2003 | Owensby | 2003/0074328 A1 * | 4/2003 | Schiff et al. .................. 705/75 |
| 6,647,269 B2 | 11/2003 | Hendrey et al. | 2003/0165775 A1 | 9/2003 | Endo et al. |
| 6,684,195 B1 | 1/2004 | Deaton et al. | 2003/0212595 A1 | 11/2003 | Antonjuci |
| 6,775,539 B2 | 8/2004 | Deshpande | 2004/0044621 A1 | 3/2004 | Huang |
| 6,837,425 B2 | 1/2005 | Gauthier et al. | 2004/0054575 A1 | 3/2004 | Marshall |
| 6,901,373 B1 * | 5/2005 | Chasko ....................... 705/14 | 2004/0117254 A1 | 6/2004 | Nemirofsky et al. |
| 6,912,398 B1 | 6/2005 | Domnitz | 2004/0254848 A1 | 12/2004 | Golan et al. |
| 7,013,286 B1 | 3/2006 | Aggarwal | 2006/0085260 A1 | 4/2006 | Yamagishi |
| 7,055,031 B2 | 5/2006 | Platt | 2006/0111967 A1 | 5/2006 | Forbes |
| 2001/0005831 A1 | 6/2001 | Lewin et al. | 2007/0203833 A1 | 8/2007 | Huang |
| 2001/0011247 A1 | 8/2001 | O'Flaherty et al. | * cited by examiner | | |

COMPACT PROTOCOL AND SOLUTION FOR SUBSTANTIALLY OFFLINE MESSAGING BETWEEN PORTABLE CONSUMER DEVICE AND BASE DEVICE

CROSS-REFERENCES TO RELATED APPLICATIONS

This application is a continuation of U.S. patent application Ser. No. 11/491,551, filed on Jul. 20, 2006, which is a continuation of U.S. patent application Ser. No. 10/990,289, filed on Nov. 15, 2004, which is a continuation of U.S. patent application Ser. No. 10/244,044 filed on Sep. 13, 2002, now U.S. Pat. No. 6,837,425 B2, which are all hereby incorporated by reference, as if set forth in full in this document, for all purposes.

BACKGROUND OF THE INVENTION

The present invention generally relates to communications between a portable device and a base device. More specifically, the present invention relates to a method and system for providing storage and display of transactional messages using message codes communicated from a portable device to a base device.

With the continuing demand for using information to provide enhanced consumer experience, base devices and portable devices may be leveraged to provide a personalized experience for a consumer during a purchase transaction at a merchant. For example, a loyalty program may be provided where consumers are awarded incentives for shopping at certain merchants that participate in the loyalty program. As part of the loyalty program, merchants can use portable devices, such as smartcards, and/or base devices, such as point-of-sale (POS) devices, to keep track of the activities of various consumers and accordingly offer targeted advertising and sale offers to such consumers. As a result, the use of a loyalty program is a powerful tool that may increase consumer loyalty by giving consumers added incentive to continue shopping at merchants participating in the loyalty program.

The effectiveness of the loyalty program may be affected by the ability to communicate with the consumer during the transaction. Thus, in order to more fully increase the effectiveness of the loyalty program, information relating to a consumer's participation in the loyalty program needs to be communicated to the consumer in a fast and efficient manner, preferably, at the point-of-sale. Typically, such information is conveyed to a consumer in the form of messages displayed via a base device. Since the duration of a point-of-sale transaction is relatively short and a consumer typically does not want to wait for a message about a loyalty transaction for an extended period of time, messages intended for the consumer involved in a loyalty transaction need to be rapidly created and provided to the consumer. The longer it takes to create a message, the greater the chances that the consumer may want to skip or discontinue participating in a loyalty program due to the wait time.

Some solutions have been proposed to create messages for display to consumers participating in loyalty programs in an expedited manner. Typical solutions involve, for example, providing consumers with generic messages that were set by software or other mechanisms. These generic messages are generally fixed/predefined and cannot be varied. Also, the messages are not directly linked to the activities of a specific consumer. Consequently, these messages are not very effective because they are not personalized for the consumer and thus are not particularly informative with respect to the consumers specific status in the loyalty program. Additionally, if messages are composed using various databases residing on different servers distributed throughout the Internet, the time to compose messages increases, which further decreases the value of providing messages to consumers.

Furthermore, if messages are provided at all, the messages are typically derived from content stored in the base device because storage space and data access may be limited on the smartcard or portable device. Accordingly, existing messaging methods are relatively inflexible and do not fully use the advantages of providing a loyalty program.

Hence, it would be desirable to provide a system that is capable of providing messages to a consumer in an efficient and expedited manner during a purchase transaction, thereby allowing loyalty transaction information to be displayed at the point-of-sale.

SUMMARY OF THE INVENTION

In one embodiment of the present invention, a method for providing messaging between a portable device and base device is provided. The method includes communicating one or more message codes maintained in the portable device to the base device. The base device then composes a message for a user of the portable device using a dictionary of message codes. The message codes have corresponding message values, which are used to generate the message for the one or more message codes. The generated message is then provided to the user.

In one embodiment, a system for generating a message for a user of a portable device is provided. The system comprises: a base device configured to receive one or more message codes from the portable device; a dictionary having a plurality of message codes associated with the base device, wherein the plurality of message codes correspond to a plurality of message words; a composer configured to compose the message from the received one or more message codes using corresponding message words from the dictionary, and an interface device configured to provide the composed message to the user.

In another embodiment, a method for composing a message at a base device for a user of a portable device using a dictionary of message codes is provided. The message codes having corresponding message values. The method comprises: receiving one or more message codes at the base device from the portable device; generating the message from the received one or more message codes using corresponding message values from the dictionary; and providing the generated message to the user.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
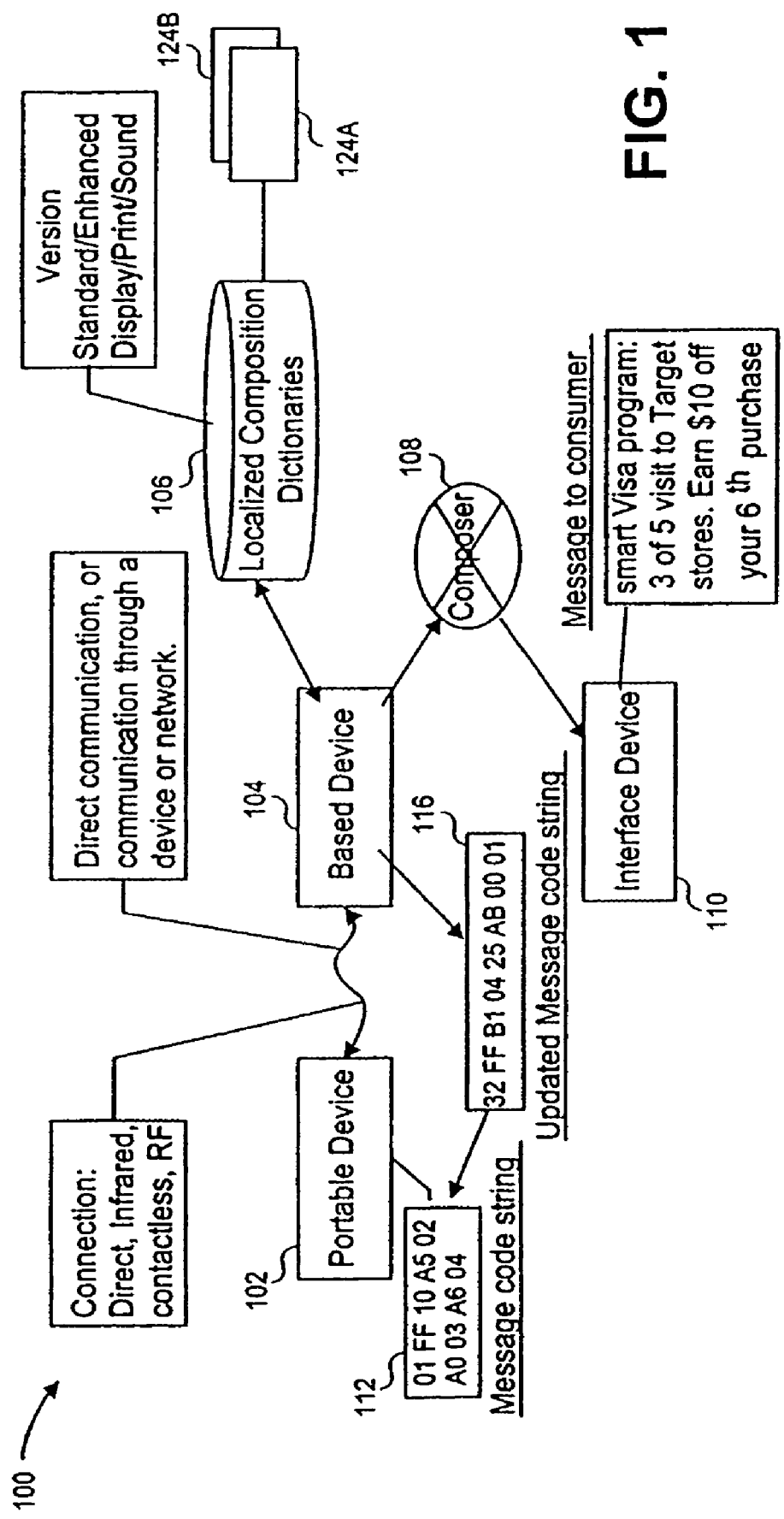
FIG. 1 is a simplified schematic diagram illustrating a system for composing a message according to one exemplary embodiment of the present invention.

The present invention in the form of one or more exemplary embodiments will now be described. FIG. 1 illustrates a system 100 for composing a message according to one exemplary embodiment of the present invention. System 100 includes a portable device 102, a base device 104, a dictionary 106, a composer 108, and an interface device 110.

Portable device 102 is a device that interfaces with base device 104. For example, portable device 102 may be a smartcard, cellular phone, personal digital assistant (PDA), pager, credit card, ATM card, digital tablet, security badge, access badge, and the like. Information, such as a message code string, is included on portable device 102 and may be read from portable device 102 or communicated to base device 104. Examples of information including message code strings will be described below.

Base device 104 is a device that interacts with portable device 102. Examples of base devices 104 include a point-of-sale (POS) device, cellular phone, PDA, computer, handheld specialized readers (e.g., smartcard key tabs), set-top boxes connected to a TV, kiosks, security system, access system, and the like. Base device 104 is configured to communicate with portable device 102 and more specifically to receive a message code string from portable device 102.

Base device 104 and portable device 102 may interact directly with one another. For example, portable device 102 and base device 104 may directly communicate through a direct connection. In this example, if portable device 102 is a smartcard and base device 104 is a POS device, the smartcard may be directly inserted into the POS device. Alternatively, portable device 102 and base device 104 may communicate through a communication medium, such as a wireless connection; wireline connection, the Internet, etc. Further, the communication may be through an intermediate computing or networking device that facilitates the communication. For example, a smartcard may communicate with a mobile-commerce server via a cell phone. In this case, a smartcard may be inserted into the cellular phone with the cellular phone communicating with the mobile-commerce server through a wireless or infrared (IR) connection. Additionally, a smartcard may be inserted into a PDA with the PDA communicating with the mobile-commerce server. It should be noted that the communication methods described above are for illustration purposes only and that a person of ordinary skill in the art will appreciate other methods that can be used to achieve communications between portable device 102 and base device 104. In one embodiment, communications between portable device 102 and base device 104 may be performed offline. In one embodiment, offline is where messaging is performed between portable device 102 and base device 104 where base device 104 is not connected to a network, such as the Internet.

It should also be noted that a device may alternately play the role of portable device 102 or base device 104 depending on the application under which the device is being used. For example, a cellular phone may function as base device 104 to receive or interface with a smartcard via a contact reader, the smartcard being the portable device 102 in this application; subsequently, the same cellular phone may function as portable device 102 to interface with a POS device via an RF, infrared, and/or bluetooth interface, the POS device being the base device 104 in this second application.

Dictionary database 106 may include one or more dictionaries, for example, dictionaries 124a,b. Each dictionary 124a,b is a database of message codes and their corresponding values or meanings. Dictionary database 106 may be embedded in base device 104. Also, dictionary database 106 may be separate from base device 104 and accessible through a communication medium. For example, dictionary database 106 may be localized in relation to base device 104 and accessible through a network, such as a local area network (LAN), wide area network (WAN), wireless network, wireline network, the Internet, and the like. Also, parts of dictionaries 124a,b may be distributed among different devices. For example, part of dictionary 124a may be located in base device 104 and part in dictionary database 106.

In one exemplary embodiment, each dictionary 124a,b may be organized in data structures of message codes/words and their respective meanings. Additionally, multiple dictionaries may be accessible to base device 104 and different versions of dictionaries may be used by base device 104. As will be further described below, one or more of the dictionaries 124a,b in the dictionary database 106 may be selected to allow a message to be composed or generated from a number of message codes.

Composer 108 may be software, embedded software, dedicated hardware, or any combination thereof, that analyzes message codes and generates a message by retrieving the appropriate values related to the message codes from dictionary 124a. For illustrative purposes herein, only one dictionary 124a is used to generate the message. Based on the disclosure and teachings provided herein, it will be clear to a person of ordinary skill in the art that more than one dictionary may be used to generate a message from the message codes. Composer 108 may be embedded in base device 104 or be accessible to base device 104. Once the message has been composed from the message codes by composer 108, composer 108 forwards the message to interface device 110. It should be noted that composer 108 may further use information from other sources or databases (not shown) to help compose or generate messages from message codes.

Interface device 110 receives the generated message from composer 108 and provides the message to a user of portable device 102. For example, interface device 110 may display the message, print the message, or announce the message audibly. If the message is audibly announced, a sound, tone, voice, or the like may be used. Additionally, any combination of methods for providing the message to the user may be used. For example, a sound and a displayed message may be used. Interface device 110 may also be part of base device 104 or be separate from base device 104 but coupled with base device 104. Examples of interface device 110 are a display screen, computer, printer, speaker, PDA, or any other device capable of providing a message to a user.

As mentioned above, message codes are included in portable device 102. In one exemplary embodiment, the message codes are strings of character and/or symbols. Referring to FIG. 1, an example of a message code string is message code string 112. As shown in FIG. 1, message code string 112 includes the codes "01 FF 10 A5 02 A0 03 A6 04". When portable device 102 communicates with base device 104, message code string 112 is communicated to base device 104 by either base device 104 retrieving message code string 112 from portable device 102 or portable device 102 forwarding message code string 112 to base device 104. Message code string 112 includes a number of constituent message codes. Base device 104 then forwards the message code string 112 to composer 108 for analysis. Composer 108 analyzes message code string 112 using dictionary 124a. In this instance, dictionary 124a is used as a default to analyze message code string 112; however, as previously mentioned, one or more dictionaries, for example, dictionaries 124a,b, may be used for this purpose. Composer 108 may be directed to select the appropriate dictionary by analyzing the message code string 112 or by following instructions provided by base device 104. Composer 108 assembles or decodes the message codes into message words that have semantic value using values corresponding to the message codes in dictionary 124a. The message words collectively form a message that is to be conveyed to a user of portable device 102. Messages may include various types of information. For example, a message may include information associated with the service being provided to the user, such as, "100 points received, valid until Dec. 31, 2010", "Smart Shopping now available at XYZ stores", and "Welcome to the XYZ network"; and a message may also include marketing or solicitation information, such as, "Use your reward points at participating ABC stores".

The message codes may correspond to message words that serve different functions. There are different categories of message words. For example, message words may be classified as constant message words, variable message words, administrative message words, and action message words.

Constant message words are message words that are constant. For example, constant message words are words, sentences, colors, graphics, or sound sequences, such as, message code "255"="congratulations, you are now participating in"; message code "A10F"="three_standard_rings"; or message code "A75F"="{HTML TAG} <TITLE>". The message value "congratulations, you are now are participating in" represents a constant string of words or a sentence. The message value "three_standard_rings" may indicate a constant sound sequence of three rings, and the message value "{HTML TAG} <TITLE>" may indicate displaying an HTML TAG of TITLE.

Variable message words refer to message words that may vary. For example, variable message words may provide a reference to information computed during the transaction or unique information specific to portable device 102. For instance, message code "ABB0"="remaining_value_on_electronic_purse"; message code "1234"="account_number_used_during_the_transaction"; or message code "DDDD"="current_date", where the message value "remaining_value_on_electronic_purse" may indicate the remaining value on an electronic account related to portable device 102; the message value "account_number_used_during_the_transaction" may refer to the account number of the user of portable device 102 that is being used during the transaction; and the message value "current_date" refers to a variable that includes the value of the current date.

An administrative message word is a message word that is used to affect the analysis of the message codes. For example, administrative message words may indicate the bit or byte length of message words, a command to interpret the message codes with a basic or enhanced dictionary 106, a code to identify which type of base device 104 (e.g., POS, PC, phone, PDA, hand-held specialized readers) the message is applicable to, a code to identify interface device 110 (display, printer) for which the message code string applies, or a version of dictionary 106 that should be used with message code string 112.

Each dictionary 124a,b may include fields for different modes, such as a standard mode and an enhanced mode. In one exemplary embodiment, an administrative message code may be used to designate the selection of a particular mode depending on certain predetermined factors. For example, a standard mode may be used for a graphical display and an enhanced mode may be used for a printed message. Also, each dictionary 124a,b may include a default, or implicit mode which is to be used by the composer in absence of an administrative word identifying the selection of a particular mode.

Action message words are used to direct base device 104 to take corresponding actions as part of the transaction. Examples of action message words include message code "XYZ"="print_receipt_only"; message code "9999"="log_message_on_base_device_for_delayed_reporting_to_service_host"; or message code "ABCD"="update_message_string_in_card". The message value "print_receipt_only" may indicate the action of only printing a receipt using interface device 110, the message value "log_message_on_base_device_for_delayed_reporting_to_service_host" indicates the action of logging the message on base device 104 for subsequent reporting, and the message value "update_message_code_string_in_card" may indicate the action of sending an updated message code string to portable device 102 to replace message code string 112.

Data contained in portable device 102 may not be for the exclusive use of generating consumer messages. In one exemplary embodiment, data used by portable device 102 for purposes other than messaging may also be read by or transmitted to base device 104 and used for composing a message. For example, device information such as an application's ID (AID) in a smartcard may be a code string "A0 00 00 00 98 10 10 04" that is typically used to identify that specific smartcard application; this particular code string may also be used to cause the generation of the message "Visa Smart Loyalty Application Version 4" when read by or transmitted to base device 104. Optionally, information may be entered via base device 104 and used as part of the composed message. For example, transactional information for a purchase, such as total purchase price, may be entered via based device 104 and included in the message displayed to the user.

Figure 2:
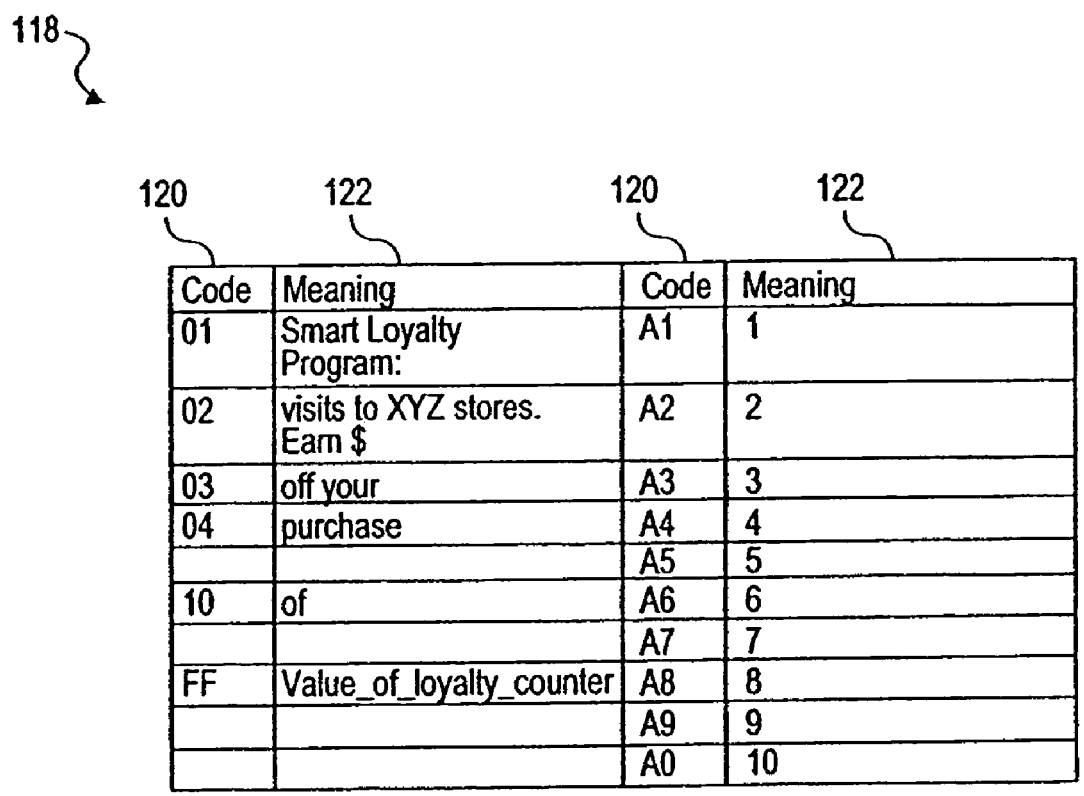
FIG. 2 is a table showing a sample list of message codes and their corresponding values in a dictionary according to one exemplary embodiment of the present invention.

FIG. 2 is a table 118 showing a sample list of message codes and their corresponding values in one dictionary 124a according to one exemplary embodiment of the present invention. As shown in FIG. 2, table 118 includes a code column 120 that includes message codes and a value column 122 that includes corresponding values for the message codes.

Message codes may be stored in a binary form, hexadecimal form, or any other standardized format that is interpretable by base device 104 and/or composer 108. Based on the disclosure and teachings provided herein, a person of ordinary skill in the art will know how to use different formats to store the message codes depending on the system design and requirements.

In one exemplary embodiment, some of the message codes are not uniformly predefined and fixed across all dictionaries 124, but rather are specifically identified by a dictionary associated with a particular base device 104. In other words, the same message code does not necessarily have the same meaning in different dictionaries 124a,b. Accordingly, a message code stored in portable device 102 may have different meanings in different base devices 104 depending on the associated dictionary 124a for each base device 104. For example, a message code "1234" equals "congratulations, you have been entered into our loyal consumer program and now have:" when-base device 104 is a POS device, and the same message code may be interpreted as "loyal consumer points:" when base device 104 is a cellular phone with a small display.

Dictionary database 106 may also include multiple versions of a dictionary 124a,b. For example, base device 104 may be associated with multiple interface devices 110 where different versions of dictionaries are used for the different interfaces. If a display and a printer are available, different messages may be provided to a user through the different interfaces. Thus, composer 108 may compose a message from a message code string "32 50 15 FF 0A" as "Welcome to the Smart Shopping Network" on a printer interface device 110 and as a logo on a Point-of-sale display interface device 110. In another example, different versions of dictionary 124*a,b* may include versions with different languages. In one exemplary embodiment, administrative message codes may be used to identify an appropriate dictionary version. By using different versions of dictionaries, different messages may be created for different interface devices while maintaining the same message code at the same time, and thus simplifying data storage on the portable device.

In one example, the following message codes may be translated differently based on base device 104 and/or interface device 110, or a version of dictionary 124. Table 1 illustrates an embodiment of this example.

TABLE 1

| Message Code | Dictionary Version | Message |
|---|---|---|
| 105 | 100 | Good Morning |
| 105 | 101 | Good AM |
| 105 | 102 | Bonjour |
| 107 | 100 | You are a winner |
| 107 | 101 | U R a wnr |
| 107 | 102 | Vous etes un gagnant |

Additionally, dictionaries 124*a,b* in the dictionary database 106 may be updated at any time. For example, message codes and/or message values may be changed and new message codes and/or message values may be added. Updates may be provided periodically to dictionary database 106 in a number of ways, for example, by a de-localized service management host or server or other computing device used for the management of the dictionary database 106. Furthermore, updates may be-performed on an automated, pre-scheduled basis or in an ad hoc manner.

In addition, message code string 112 may be changed in portable device 102 and new message code string may be added to portable device 102. Message code string may be changed or added during communications between portable device 102 and base device 104. For example, once message code string 112 is composed into a message and the message is provided to the user of portable device 102, base device 104 may update message code string 112 in portable device 102 for use in future transactions or data exchanges. For example, if a user of portable device 102 has conducted a transaction, information relating to that transaction will be included in message code string 112 as updated in portable device 102.

Figure 3:
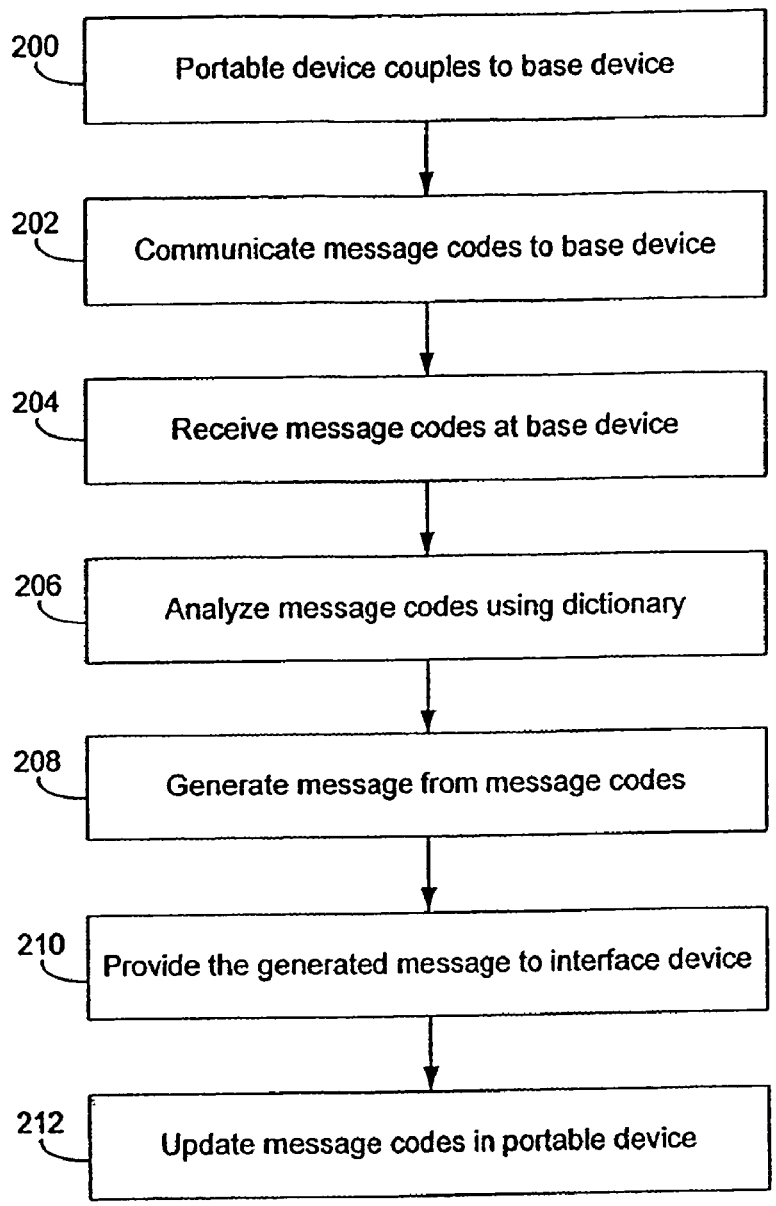
FIG. 3 is a flowchart illustrating an exemplary process for composing and providing a message according to one exemplary embodiment of the present invention.

FIG. 3 illustrates a simplified flowchart of a process for composing and providing a message according to one exemplary embodiment of the present invention. The flowchart will be described with reference to FIG. 1.

In step 200, portable device 102 couples to base device 104. As mentioned above, portable device 102 may couple directly to base device 104, through a communication medium, through an intermediate computing or networking device, etc.

In step 202, portable device 102 communicates a message code string 112 to base device 104. For example, as shown in FIG. 1, "01 FF 10 A5 02 A0 03 A6 04" is communicated to base device 104.

In step 204, base device 104 receives message code string 112. In step 206, composer 108 then analyzes the message codes in message code string 112 using dictionary 124*a*. In analyzing the message codes, composer 108 may determine based on an administrative message code which one or more of the dictionaries 124*a* in dictionary database 106 are to be used and using the appropriate dictionary(ies) 124 retrieve the corresponding applicable message code values.

In step 208, composer 108 generates a message from message code string 112. Assuming table 118 is used as dictionary 124*a*, the message generated from the corresponding message codes is "Smart loyalty program: 3 of 5 visits to XYZ store. Earn $10 off your 6th purchase." This assumes that the message code FF corresponds to the variable of three.

At step 210, the message is then provided to interface device 110 for communication to a user of portable device 102. For example, the message may be printed, displayed, or audibly communicated to the user through interface device 110.

In step 212, an updated message code string 116 may be provided to portable device 102. Updated message code string 116 may correspond to a message for any future communications between portable device 102 and base device 104. An updated message code string 116 may be appropriate due to the recent activity or transaction conducted by the user of portable device. The message corresponding to the updated message code string 116 may also be forwarded to interface device 110 for display to the user.

One example using an exemplary embodiment of the present invention will now be described. A user is shopping in a first store and has a portable device 102. While browsing at the first store, the user wants to find out the latest account information relating to the user's loyalty program at the first store. To find that latest account information, the user couples portable device 102 to base device 104. Consequently, message code string 112 is communicated to base device 104 and a message is composed from the message code string 112 using composer 108 and dictionary 124*a*. The message corresponding to the message code string 112 is displayed on interface device 110 for viewing by the user. For example, the message may say "200 additional points will earn you a special offer".

Subsequently, the user decides to make a purchase at the first store. The purchase is worth two hundred (200) points. Once again, the user couples portable device 102 to base device 104 to complete the purchase. Portable device 102 and base device 104 then communicate with each other. During their communication, base device 104 sends an updated message code string 116 to portable device 102. At the same time, a message corresponding to updated message code string 116 is displayed on a screen connected to base device 104. Based on the purchase that the user just concluded, the message may include loyalty transaction information indicating that the user has just received a certain number of reward points for the purchase; the message may further include a marketing message informing the user that the reward points are valid toward special offers at a second store. For example, the message may say "your purchase just earned you 200 points and qualifies you for a special offer which may be redeemed at a second store". Additionally, a receipt may also be printed from a printer. The receipt may includes information relating to the loyalty program printed in a different format than that shown on the screen connected to base device 104.

The user then goes to a mall where the second store is located. The user may double check the message that corresponds to updated message code string 116 using base device 104. Base devices 104 may be located throughout the mall. The user then proceeds to the second store after reading the message and connects with base device 104 located in the second store to find out about the special offer. Information relating to the special offer is specific to the second store and is made available through base devices 104 located throughout the second store.

The user then proceeds to make a purchase and at checkout, again couples portable device 102 to base device 104 located at the second store. Updated message code string 116 is again composed into a message by composer 108 using dictionary 124. Based on the purchase information, the composed message indicates that the user has earned a number of points on this purchase and that the special offer has been extended for a certain time period. Information relating to the purchase and the extended time period is then encoded and sent in another updated message code string 116 to portable device 102.

After leaving the second store, the user forgets how long the extended time period is for the special offer. The user can couple portable device 102 to base device 104, such as, a PC reader located at the user's home to quickly access that information on portable device 102 without having to connect to the Internet. The foregoing is merely an illustration of one of many applications that may utilize the present invention. A person of ordinary skill in the art will know of other applications in which the present invention can be deployed.

Furthermore, based on the disclosure and teachings provided herein, it will be clear to a person of ordinary skill in the art that many advantages are provided by various exemplary embodiments of the present invention. For example, messages for a consumer involved in a loyalty transaction using loyalty information pertinent to the transaction and the consumer may be rapidly created and provided to the consumer. A message code is included in a portable device in a very compact form, which keeps memory requirements minimal and communication times fast. Additionally, the use of the logically organized composition data structure for a dictionary 124 ensures rapid composition of messages from message codes. Also, various types of message words may be used depending on different kinds of transactions and different kinds of interface devices. Thus, by relying on the content of a specific dictionary 124 associated with a particular base device 104 to determine the semantic value of the message codes, flexibility is introduced between different portable devices 102, base devices 104, and interface devices 110.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   receiving a message code at a base device from a portable payment device via a direct wireless connection, wherein the message code is received by the base device comprising an RF interface, wherein the message code is associated with a reward program, and wherein the portable payment device comprises a cellular phone;
   generating a reward message using the message code and a dictionary associated with the base device; and
   providing the reward message after the message code is retrieved.

2. The method of claim 1 wherein the base device comprises a point of sale terminal.

3. The method of claim 1 wherein the reward message comprises points that are useable for a subsequent purchase.

4. The method of claim 1 wherein the base device comprises a cellular phone.

5. The method of claim 1 wherein providing the reward message further comprises displaying the reward message to a consumer.

6. The method of claim 1 wherein the method further comprises:
   providing an updated message code to the portable payment device using the base device.

7. The method of claim 1 wherein the base device is at a store.

8. The method of claim 1 wherein the reward message indicates that a consumer is entitled to a discount.

9. The method of claim 1 wherein the portable payment device comprises a smartcard.

10. A system comprising:
    a base device configured to receive a message code from a portable payment device via a direct wireless connection, wherein the base device comprises an RF interface, wherein the message code is associated with a reward program, and wherein the portable payment device comprises a cellular phone; and
    a composer configured to generate a reward message using the retrieved message code and a dictionary and send the reward message to an interface device.

11. The system of claim 10 wherein the reward message comprises a loyalty message.

12. The system of claim 10 wherein the composer is embedded in the base device.

13. The system of claim 10 wherein the reward message is a variable message.

14. The system of claim 10 further comprising an interface device coupled to the base device.

15. The system of claim 14 wherein the interface device comprises a display screen, computer, printer, speaker, or PDA.

16. The system of claim 10 wherein the base device is located at a store.

17. The system of claim 10 wherein the reward message is displayed on the interface device.

18. A system comprising:
    a base device configured to receive a message code from a portable payment device via a wireless connection, wherein the base device comprises an RF interface, wherein the message code is associated with a reward program, and wherein the portable payment device comprises a cellular phone; and
    a composer configured to generate a reward message using the retrieved message code and a dictionary and send the reward message to an interface device wherein the portable payment device and the base device are not connected to a network when the message code is received by the base device.

19. The system of claim 18 wherein the dictionary is embedded in the base device.

20. The system of claim 18 wherein the base device is configured to retrieve the message code from the portable payment device.

21. The system of claim 18 wherein the portable payment device is configured to forward the message code to the base device.

* * * * *

UNITED STATES PATENT AND TRADEMARK OFFICE
CERTIFICATE OF CORRECTION

| | |
|---|---|
| PATENT NO. | : 7,703,668 B2 |
| APPLICATION NO. | : 11/584398 |
| DATED | : April 27, 2010 |
| INVENTOR(S) | : Patrick Gauthier et al. |

Page 1 of 1

It is certified that error appears in the above-identified patent and that said Letters Patent is hereby corrected as shown below:

Title Pg, Item (73) Assignee: Delete "Vista U.S.A.", insert -- Visa U.S.A. --.

Signed and Sealed this

Seventh Day of September, 2010

David J. Kappos
*Director of the United States Patent and Trademark Office*